(12) United States Patent
Han et al.

(10) Patent No.: US 8,834,755 B2
(45) Date of Patent: Sep. 16, 2014

(54) PROCESS OF MAKING WHOLLY AROMATIC POLYAMIDE FILAMENT

(75) Inventors: In-Sik Han, Daegu (KR); Jae-Young Lee, Daegu (KR); Seung-Hwan Lee, Gumi-si (KR); Jae-Young Kim, Gumi-si (KR); So-Yeon Kwon, Busan (KR)

(73) Assignee: Kolon Industries, Inc., Kwacheon-Si (KR)

( * ) Notice: Subject to any disclaimer, the term of this patent is extended or adjusted under 35 U.S.C. 154(b) by 565 days.

(21) Appl. No.: 12/792,225

(22) Filed: Jun. 2, 2010

(65) Prior Publication Data
US 2010/0301516 A1 Dec. 2, 2010

Related U.S. Application Data

(62) Division of application No. 11/994,641, filed as application No. PCT/KR2006/002624 on Jul. 5, 2006, now Pat. No. 7,851,061.

(30) Foreign Application Priority Data

Jul. 6, 2005 (KR) .................. 10-2005-0060502

(51) Int. Cl.
*D01F 13/04* (2006.01)
*D01D 5/06* (2006.01)
*D01F 6/60* (2006.01)

(52) U.S. Cl.
CPC . *D01F 6/605* (2013.01); *D01D 5/06* (2013.01)
USPC ............. 264/37.22; 264/37.26; 264/179; 264/180; 264/184

(58) Field of Classification Search
USPC ............ 264/178 R, 179, 180, 181, 184, 203, 264/178 F, 37.2, 37.22, 37.26
See application file for complete search history.

(56) References Cited

U.S. PATENT DOCUMENTS

| | | | |
|---|---|---|---|
| 3,742,104 A * | 6/1973 | Jamison et al. | ........... 264/184 X |
| 3,869,429 A | 3/1975 | Blades | |
| 3,869,430 A | 3/1975 | Blades | |
| 4,073,837 A * | 2/1978 | Kouzai et al. | ............. 264/184 X |
| 4,340,559 A * | 7/1982 | Yang | .............................. 264/181 |
| 4,342,715 A * | 8/1982 | Shimada et al. | ............... 264/184 |
| 5,851,466 A * | 12/1998 | Yabuki et al. | ............. 264/184 X |
| 6,569,366 B1 | 5/2003 | Toyohara et al. | |
| 6,592,987 B1 | 7/2003 | Sakamoto et al. | |

FOREIGN PATENT DOCUMENTS

| | | |
|---|---|---|
| JP | 2000-54224 A | 2/2000 |
| KR | 1996-0017943 A | 6/1996 |

* cited by examiner

*Primary Examiner* — Leo B Tentoni
(74) *Attorney, Agent, or Firm* — Birch, Stewart, Kolasch & Birch, LLP

(57) ABSTRACT

Disclosed are wholly aromatic polyamide filament and a method of manufacturing the same, characterized by comprising multi-stage injection of a coagulant with sulfuric acid concentration lowered sequentially stage by stage, to a spun material fed into a coagulant injection tank. The present invention enables increase of a spinning and take-up velocity without occurrence of thread cutting by uniformly and evenly coagulating surface and inside of the spun material. In addition, the present invention recovers the coagulant or water already used and reuses the recovered coagulant or water in the earlier stages, so that it has advantages of saving production costs and reducing environmental contamination. Accordingly, the wholly aromatic polyamide filament produced according to the present invention has high crystallinity X, large apparent crystal size ACS and reduced defects in the crystal itself, thereby exhibiting more improved physical properties such as strength and modulus.

5 Claims, 2 Drawing Sheets

PROCESS OF MAKING WHOLLY AROMATIC POLYAMIDE FILAMENT

Cross Reference to Related Applications:

This application is a Divisional of application Ser. No. 11/994,641 filed on Jan. 3, 2008 now U.S. Pat. No. 7,851,061, application Ser. No. 11/994,641 is a 371 of PCT/KR2006/002624 filed Jul. 5, 2006, and which claims priority to Application No. 10-2005-0060502 filed in the Republic of Korea, on Jul. 6, 2005. The entire contents of all of the above applications are hereby incorporated by reference.

TECHNICAL FIELD

The present invention relates to wholly aromatic polyamide filament and a method of manufacturing the same, and more particularly, to a method of manufacturing novel wholly aromatic polyamide filament with physical properties including high strength and modulus.

BACKGROUND ART

As disclosed in early known arts, for example, U.S. Pat. Nos. 3,869,429 and 3,869,430, wholly aromatic polyamide filaments are manufactured by a series of processes including: a process of preparing wholly aromatic polyamide polymer by polymerizing aromatic diamine and aromatic diacid chloride in a polymerization solvent containing N-methyl-2-pyrrolidone; a process of preparing a spinning liquid dope by dissolving the prepared polyamide polymer in a concentrated sulfuric acid solvent; a process of forming filaments by extruding the spinning liquid dope through spinnerets and passing the spun material through a non-coagulation fluid layer into a coagulant tank; and a process of refining the resulting filaments by washing, drying and heat treatment processes.

FIG. 1 is a schematic view illustrating a conventional method of manufacturing wholly aromatic polyamide filament by general known dry-wet spinning process.

As to the conventional process illustrated in FIG. 1, since the spun material is fed into a coagulation tank 50 through the non-coagulation fluid layer and coagulated in the tank, surface of the spun material is coagulated faster and more than inside thereof, thereby causing a problem that physical properties of the surface and inside of the spun material are irregular and different from each other. Accordingly, in case of applying a high spinning and take-up velocity, a lot of cut threads and/or staples are typically generated, thus, it is not possible to increase the spinning and take-up velocity above 600 m/min.

Such limitation of the spinning and take-up velocity affects the final product, that is, wholly aromatic polyamide filament, so as not to have the strength and modulus improved above desired levels and creates a problem in raising productivity thereof.

Meanwhile, Korean Patent Laid-Open No. 1995-934 proposes a process of manufacturing wholly aromatic polyamide fiber that arranges two injection nozzles in a coagulant tank 50, and injects water or aqueous sulfuric acid solution to spun material through one of the nozzles which is mounted on the upper part while injecting water to the spun material through the other nozzle which is positioned on the lower part of the tank.

However, the above process does not use a recycling system to recover and reuse the coagulant, leading to rising in production costs and causing environmentally serious contamination.

Moreover, since this process is not subject to application of a mechanism for controlling injection velocity dependent on dilution level of sulfuric acid in the coagulant, it has a disadvantage in that the surface and inside of the spun material are unable to be evenly and uniformly coagulated.

As a result of intensive study and investigation made by the present inventor in order to solve the foregoing conventional problems, the present invention has been suggested to produce novel wholly aromatic polyamide filament with improved strength and modulus with reasonable cost and without environmental contamination.

DISCLOSURE OF THE INVENTION

Technical Problem

Therefore, an object of the present invention is to improve strength and modulus of wholly aromatic polyamide filament as a final product by uniformly or evenly coagulating surface and inside of a spun material to enable a high velocity spinning without occurrence of thread cutting.

Another object of the present invention is to reuse a coagulant or water, which was used once and recovered, in a coagulation process so that it can save production costs and reduce environmental contamination.

A still further object of the present invention is to provide wholly aromatic polyamide filament with noticeably improved modulus and b strength which can tolerate external stress by structural alteration that represents high crystallinity (referred to as "X"), large apparent crystal size (referred to as "ACS") and reduced paracrystalline parameter (referred to as "$g_{II}$"), which represents defects of a crystal itself, by uniformly or evenly coagulating surface and inside of the spun material.

Technical Means to Solve the Problem

In order to solve the conventional problems and achieve the above objects, the present invention provides a process of manufacturing wholly aromatic polyamide filament, comprising: dissolving wholly aromatic polyamide polymer in a concentrated sulfuric acid solvent to prepare a spinning liquid dope; spinning the spinning liquid dope through spinnerets to give a spun material; and feeding the spun material through a non-coagulation fluid layer into a coagulant injection tank containing coagulant, characterized in that the methods comprises the step of multi-stage injecting of the coagulant with sulfuric acid concentration lowered sequentially stage by stage, to the spun material fed into the injection tank.

Additionally, the wholly aromatic polyamide filament of the present invention is characterized in that the crystallinity X before heat treatment ranges from 70 to 79% and the apparent crystal size ACS (based on 200 plane) before heat treatment ranges from 42 to 50 Å.

Hereinafter, the present invention will be described in detail with reference to the accompanying drawings.

Firstly, according to the present invention, wholly aromatic polyamide polymer is prepared by polymerizing aromatic diamine and aromatic diacid chloride in a polymerization solvent containing N-methyl-2-pyrrolidone.

The aromatic diamine preferably comprises p-phenylenediamine and the aromatic diacid chloride preferably comprises terephthaloyl chloride.

Also, the polymerization solvent preferably comprises N-methyl-2-pyrrolidone containing dissolved calcium chloride.

The wholly aromatic polyamide polymer has intrinsic viscosity of not less than 5.0, which is preferable for improving the strength and modulus of the filament.

Conditions of polymerization for the above polymer are substantially same as those previously known, for example, in U.S. Pat. No. 3,869,429 or the like.

A preferred embodiment of the method for producing the above polymer provides microfine powder form of polymer by introducing a solution which is obtainable by dissolving 1 mole of p-phenylenediamine in N-methyl-2-pyrrolidone containing about 1 mole of calcium chloride, and 1 mole of terephthaloyl chloride into a reactor for polymerization; agitating the mixture in the reactor to form a gel type of polymer; and crushing, washing and drying the gel type polymer, thereby resulting in the polymer in the microfine powder form. The terephthaloyl chloride may be introduced into the reactor in halves by two steps.

Next, the wholly aromatic polyamide polymer prepared as described above is dissolved in a concentrated sulfuric acid solvent to form a spinning liquid dope.

The concentrated sulfuric acid used in production of the spinning liquid dope preferably has a concentration ranging from 97 to 100% and may be replaced by chlorosulfuric acid or fluorosulfuric acid.

If the concentration of the sulfuric acid is below 97%, solubility of the polymer is lowered and non-isotropic solution cannot easily express liquid crystallinity. Therefore, it is difficult to obtain the spinning liquid dope with a constant viscosity, and in turn, to manage the spinning process, thus causing mechanical properties of a final textile product to be deteriorated.

Otherwise, when the concentration of the concentrated sulfuric acid exceeds 100%, $SO_3$ content becomes excessive in any fumed sulfuric acid containing over-dissociated $SO_3$, thus, it is undesirable to handle and use the sulfuric acid as the spinning liquid dope because it causes partial dissolution of the polymer. In addition, even if the fiber is obtainable by using the spinning liquid dope, it has loose inner structure, is substantially lusterless in terms of appearance and decreases diffusion rate of the sulfuric acid into the coagulant solution, so that it may cause a problem of lowering mechanical properties of the b fiber.

Alternatively, the concentration of polymer in the spinning liquid dope preferably ranges from 10 to 25% by weight.

However, both of the concentration of the concentrated sulfuric acid and the concentration of the polymer in the spinning liquid dope are not particularly limited.

In the next step as shown in FIG. 2, injection of the coagulant is carried out, with the sulfuric acid concentration being sequentially lowered stage by stage, preferably, for two to five stages, to the spun material resulting from spinning the liquid dope through a spinneret 40. The coagulant is preferably any one selected from aqueous sulfuric acid solution and water. Preferred embodiment of the present invention provides the filament manufactured by passing the spun material as illustrated in FIG. 2 through first coagulant injection tank 10, second coagulant injection tank 20 and third coagulant injection tank 30 in order to inject the coagulants to the spun material via a non-coagulation fluid layer.

The non-coagulation fluid layer may generally comprise an air layer or an inert gas layer.

FIG. 2 is a schematic view illustrating a process of manufacturing wholly aromatic polyamide filament by a dry-wet spinning method according to the present invention.

Depth of the non-coagulation fluid layer, that is, a distance from the bottom of the spinneret 40 to the surface of the coagulant in the coagulant tank 50 preferably ranges from 0.1 to 15 cm, in order to improve spinning ability or physical properties of the filament.

The first to third injection tanks 10, 20 and 30 are equipped with injection nozzles 11, 21 and 31, respectively, to inject the coagulant to the spun material for spinning.

Each of the coagulant injection tanks 10, 20 and 30 preferably has the bottom inclined sufficiently so as to easily collect and return the injected coagulant to earlier stages, and also perforated to form holes through which the spun material passes.

The coagulant injected from the coagulant injection tanks 10, 20 and 30 is partially collected on the bottom of the corresponding tank and reused in the earlier processes while the remained coagulant as well as the spun material flows down and is stored in a coagulant collection vessel 51.

The first coagulant injection tank 10 injects the aqueous sulfuric acid solution with the sulfuric acid concentration of 10 to 20% contained therein at an injection velocity of 1 to 10 m/sec, through the injection nozzle 11 to the spun material. After the injection, the aqueous sulfuric acid solution is discharged out of the first coagulant injection tank 10.

The aqueous sulfuric acid solution used is the coagulant used in the second coagulant injection tank 20, which is transferred from the second coagulant injection tank 20 to the injection nozzle 11 via a coagulant transportation duct L1.

The second coagulant injection tank 20 injects the aqueous sulfuric acid solution, with sulfuric acid concentration of 3 to 10%, as the coagulant, at an injection velocity of 13 to 20 m/sec, through the injection nozzle 21 to the spun material.

After the injection, the aqueous sulfuric acid solution contained in the second coagulant injection tank 20 is transferred into the first coagulant injection tank 10 equipped with the injection nozzle 11 via the coagulant transportation duct L1 and reused, as described above.

The aqueous sulfuric acid solution (the sulfuric acid concentration of 3 to 10%) used in the second coagulant injection tank 20, has the sulfuric acid concentration increased up to 10, to 20% after the injection, thus, can be applied as the coagulant for the first coagulant injection tank 10.

Furthermore, the aqueous sulfuric acid solution injected from the second coagulant injection tank 20 is the coagulant used in the third coagulant injection tank 30, which is transferred from the third coagulant injection tank 30 to the injection nozzle 21 via a coagulant transportation duct L2.

Likewise, the third coagulant injection tank 30 injects water, especially, pure water as the coagulant at a velocity of 20 to 25 m/sec through the injection nozzle 31, to the spun material.

After the injection, the coagulant contained in the third coagulant injection tank 30 is transferred into the second coagulant injection tank equipped with the injection nozzle 21 via the coagulant transportation duct L2 and reused, as described above.

The water used in the third coagulant injection tank 30 has the sulfuric acid concentration increased up to 3 to 10% after the injection, thereby being possibly applied as the coagulant for the second coagulant injection tank 20.

The water, especially, pure water injected from the third coagulant injection tank 30 is fed into the injection nozzle 31 through a water feeding pipe 32.

As illustrated in the foregoing description, the present invention is characterized in that the spun material, after passing through the non-coagulation fluid layer, is subject to multi-stage injection of the coagulant with the sulfuric acid concentration lowered sequentially stage by stage.

Preferably, the injection velocity of the coagulant gradually increases stage by stage in conjunction with the injection.

As a result, the surface and inside of the spun material are uniformly and evenly coagulated, thereby providing advantages in that the present invention generates no cut threads even at the high spinning velocity, and has noticeably improved modulus and strength which can tolerate external stress by structural alteration that represents high crystallinity X, large apparent crystal size ACS and reduced paracrystalline parameter $g_{II}$, which represents defects of a crystal itself.

Subsequently, the formed filament is subject to washing, drying and heat treatment to manufacture wholly aromatic polyamide.

The spinning and take-up velocity ranges from 700 to 1,500 m/min.

The resulting wholly aromatic polyamide according to the present invention has uniformly coagulated surface and inside of the spun material, and exhibits high crystallinity X, large apparent crystal size ACS and reduced paracrystalline parameter $g_{II}$, which represents defects of a crystal itself, so that it has excellent strength before and after the heat treatment of not less than 26 g/d, and excellent modulus before the heat treatment of not less than 750 g/d and after the heat treatment of not less than 950 g/d.

More particularly, the wholly aromatic polyamide filament according to the present invention has the crystallinity X ranging from 70 to 95%, more preferably, 76 to 79% and the apparent crystal size ACS (based on 200 plane) before the heat treatment ranging from 42 to 50 Å, and more preferably, 47 to 50 Å.

In addition, the wholly aromatic polyamide filament according to the present invention has the paracrystalline parameter $g_{II}$ ranging from 1.7 to 1.9% before the heat treatment and 1.3 to 1.6% after heat treating at 300° C. under 2% tension for 2 seconds.

Also, the crystallinity X ranges from 76 to 83% and the apparent crystal size ACS (based on 200 plane) ranges from 46 to 55 Å, respectively, after the heat treatment at 300° C. under 2% tension for 2 seconds.

When both of the crystallinity X and the apparent crystal size ACS exceed the above ranges, the strength is reduced while the modulus increases. On the contrary, in case that the crystallinity X and the apparent crystal size ACS are less than the above ranges, it shows insignificant increase of the modulus.

Also, if the paracrystalline parameter $g_{II}$ exceeds the above range, the modulus is reduced. In case of less than the above, although the modulus increases it is within an area which is difficult to be achieved by the present invention.

Accordingly, compared with conventional wholly aromatic polyamide filament, the wholly aromatic polyamide filament of the present invention has the surface and inside uniformly and evenly coagulated, therefore, represents higher crystallinity X, larger ACS and lower paracrystalline parameter $g_{II}$ before and after the heat treatment so that it has improvement in degree of crystallinization. As a result, the wholly aromatic polyamide exhibits excellent strength and remarkably improved modulus.

Advantageous Effects

As described above, the present invention enables uniform and even coagulation of the surface and inside of the spun material, thereby enhancing the spinning and take-up velocity without occurrence of thread cutting.

Accordingly, the wholly aromatic polyamide filament manufactured by the present invention has the surface and inside uniformly and evenly coagulated, thereby representing high crystallinity X, large ACS and reduced paracrystalline parameter $g_{II}$ and crystalline defects so that it exhibits excellent strength and remarkably improved modulus.

BRIEF DESCRIPTION OF THE DRAWINGS

The above object, features and advantages of the present invention will become more apparent to those skilled in the related art from the following preferred embodiments of the invention in conjunction with the accompanying drawing.

EXPLANATION OF REFERENCE NUMERALS OF MAIN PARTS OF THE DRAWINGS

Figure 1:
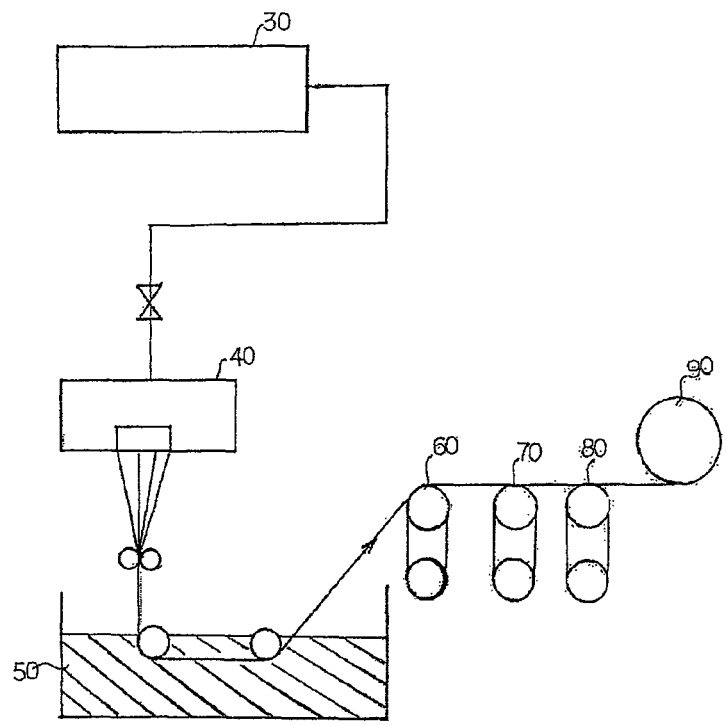
FIG. 1 is a schematic view illustrating a process of manufacturing wholly aromatic polyamide filament by conventional dry-wet spinning process.

10: first coagulant injection tank
20: second coagulant injection tank
30: third coagulant injection tank
11,21,31: injection nozzle 32: water feeding pipe
L1,L2: coagulant transportation duct 40: spinneret
50: coagulant tank
51: coagulant collection vessel
60: washing device 70: dryer
80: heat treatment device 90: winder

BEST MODE FOR CARRYING OUT THE INVENTION

Features of the present invention described above and other advantages will be more clearly understood by the following non-limited examples and comparative examples. However, it will be obvious to those skilled in the art that the present invention is not restricted to the specific matters stated in the examples below.

EXAMPLE 1

1,000 kg of N-methyl-2-pyrrolidone was maintained at 80° C. and combined with 80 kg of calcium chloride and 48.67 kg of p-phenylenediamine which was then dissolved to prepare an aromatic diamine solution.

After putting the aromatic diamine solution in a polymerization reactor 20 and fused terephthaloyl chloride in a molar quantity equal to p-phenylenediamine simultaneously into the reactor 20, both compounds were agitated and became poly (p-phenylene terephthalamide) polymer with intrinsic viscosity of 6.8.

Continuously, the obtained polymer was dissolved in 99% concentrated sulfuric acid to form an optical non-isotropic liquid dope for spinning with 18% of polymer content.

Figure 2:
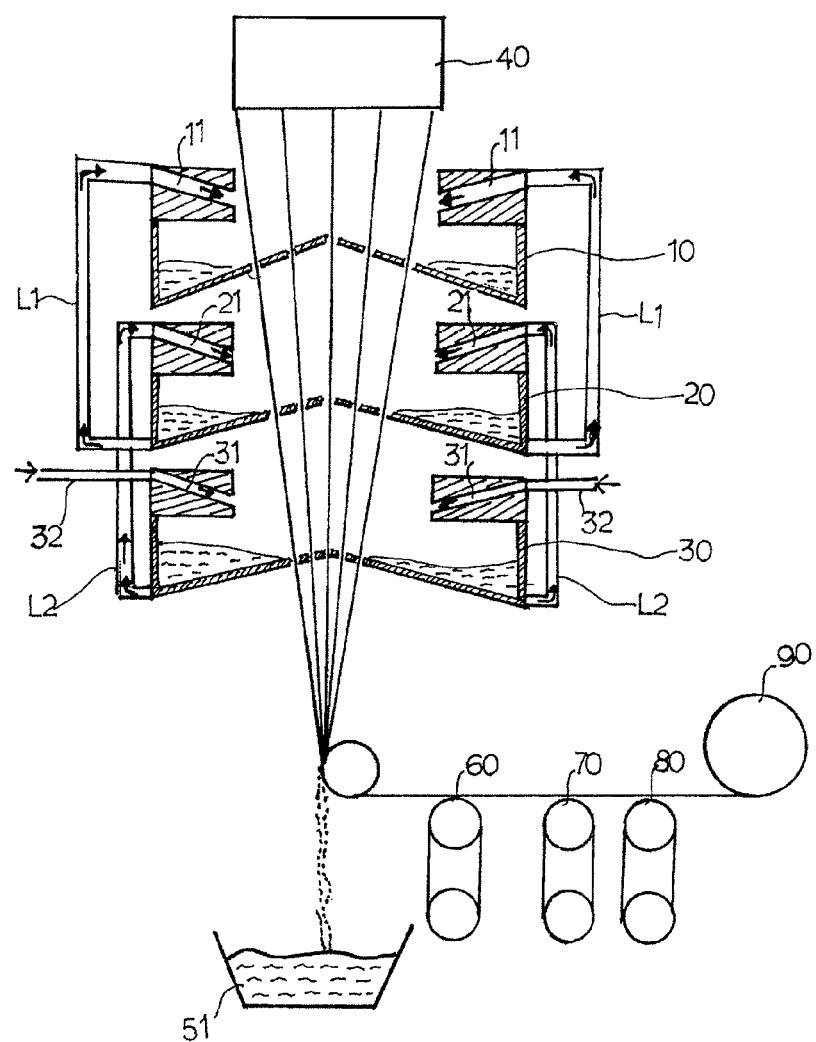
FIG. 2 is a schematic view illustrating a process of manufacturing wholly aromatic polyamide filament by a dry-wet spinning method according to the present invention.

The formed liquid dope was spun through the spinneret 40 as shown in FIG. 2. After passing the spun material through an air layer with thickness of 7 mm, it was fed into the first coagulant injection tank 10 in order to inject an aqueous sulfuric acid solution with the sulfuric acid concentration of 13% at the velocity of 3 m/sec to the spun material. After that, the first injection treated spun material passed through the second coagulant injection tank 20 and was subject to the injection of another aqueous sulfuric acid solution with the sulfuric acid concentration of 5% at the velocity of 15 m/sec. And finally, the second injection treated spun material was fed into the third coagulant injection tank 30 and subject to the injection of water, especially, pure water at the velocity of 23 m/sec. As a result, the spun material became the desired filament.

Herein, the coagulant used in the third coagulant injection tank 30 was reused as the coagulant for the second coagulant injection tank 20. Likewise, the coagulant used in the second coagulant injection tank 20 was reused as the coagulant for the first coagulant injection tank 10.

Next, to the formed filament, water was injected at 25° C. to rinse the filament, followed by passing the filament through a double-stage dry roller having the surface temperature of 150° C. and winding the rolled filament to result in poly (p-phenylene terephthalamide) filament before heat treatment.

Subsequently, the resulting filament was subject to heat treatment at 300° C. under 2% tension for 2 seconds to yield a final product, that is, poly (p-phenylene terephthalamide) filament after heat treatment.

Various physical properties of the produced poly (p-phenylene terephthalamide) filament before and after heat treatment were determined and the results are shown in the following Table 1.

EXAMPLE 2

1,000 kg of N-methyl-2-pyrrolidone was maintained at 80° C. and combined with 80 kg of calcium chloride and 48.67 kg of p-phenylenediamine which was then dissolved to prepare an aromatic diamine solution.

After putting the aromatic diamine solution in a polymerization reactor 20 and fused terephthaloyl chloride in a molar quantity equal to p-phenylenediamine simultaneously into the reactor 20, both compounds were agitated and became poly (p-phenylene terephthalamide) polymer with intrinsic viscosity of 6.8.

Continuously, the obtained polymer was dissolved in 99% concentrated sulfuric acid to form an optical non-isotropic liquid dope for spinning with 18% of polymer content.

The formed liquid dope was spun through the spinneret 40 as shown in FIG. 2. After passing the spun material through an air layer with thickness of 7 mm, it was fed into the first coagulant injection tank 10 in order to inject an aqueous sulfuric acid solution with the sulfuric acid concentration of 18% at the velocity of 5 m/sec to the spun material. After that, the first injection treated spun material passed through the second coagulant injection tank 20 and was subject to the injection of another aqueous sulfuric acid solution with the sulfuric acid concentration of 8% at the velocity of 13 m/sec. And finally, the second injection treated spun material was fed into the third coagulant injection tank 30 and subject to the injection of water, especially, pure water at the velocity of 20 m/sec. As a result, the spun material became the desired filament.

Herein, the coagulant used in the third coagulant injection tank 30 was reused as the coagulant for the second coagulant injection tank 20. Likewise, the coagulant used in the second coagulant injection tank 20 was reused as the coagulant for the first coagulant injection tank 10.

Next, to the formed filament, water was injected at 25° C. to rinse the filament, followed by passing the filament through a double-stage dry roller having the surface temperature of 150° C. and winding the rolled filament to result in poly (p-phenylene terephthalamide) filament before heat treatment.

Subsequently, the resulting filament was subject to heat treatment at 300° C. under 2% tension for 2 seconds to yield a final product, that is, poly (p-phenylene terephthalamide) filament after heat treatment.

Various physical properties of the produced poly (p-phenylene terephthalamide) filament before and after heat treatment were determined and the results are shown in the following Table 1.

COMPARATIVE EXAMPLE 1

The production of poly (p-phenylene terephthalamide) filament before and after heat treatment was carried out in the same procedure and under similar conditions as Example 1 except that the spun material passed through the coagulant tank 50, as illustrated in FIG. 1.

Various physical properties of the produced poly (p-phenylene terephthalamide) filament before and after heat treatment were determined and the results are shown in the following Table 1.

TABLE 1

Evaluation results of physical properties of filament

| Section | | Example 1 | Example 2 | Comparative example 1 |
|---|---|---|---|---|
| Crystallinity (X) | Before heat treatment | 77% | 78% | 74% |
| | After heat treatment at 300° C. under 2% tension for 2 sec | 79% | 81% | 77% |
| Apparent crystal size (ACS; based on 200 plane) | Before heat treatment | 47 Å | 48 Å | 45 Å |
| | After heat treatment at 300° C. under 2% tension for 2 sec | 54 Å | 55 Å | 51 Å |
| Paracrystalline parameter($g_{II}$) | Before heat treatment | 1.80% | 1.85% | 1.91% |
| | After heat treatment at 300° C. under 2% tension for 2 sec | 1.56% | 1.40% | 1.66% |
| Strength (g/d) | Before heat treatment | 27 | 26 | 22 |
| | After heat treatment at 300° C. under 2% tension for 2 sec | 26 | 26 | 21 |
| Modulus (g/d) | Before heat treatment | 820 | 830 | 720 |
| | After heat treatment at 300° C. under 2% tension for 2 sec | 1,050 | 1,070 | 930 |

The foregoing listed physical properties of the filament according to the present invention were determined and/or evaluated by the following procedures:

Strength (g/d):

After measuring force g at break point of a sample yarn by means of Instron tester which is available from Instron Engineering Corp., Canton, Mass., using the sample yarn with 25 cm of length, the measured value was divided by denier number of the sample yarn to give the strength. Such strength is the average calculated from values yielded by testing the sample yarns five times. In this examination, the tension velocity was defined as 300 mm/min and the initial-load was defined as fineness×1/30 g.

Modulus (g/d):

Under the same conditions as with the strength, a stress-strain curve for the sample yarn was obtained. The modulus was determined from a slope of the stress-strain curve.

Intrinsic Viscosity:

A sample solution was prepared by dissolving 0.1250 g of a sample, that is, polymer or filament in 25.0 ml of 98% sulfuric acid as a solvent. Then, after measuring flow time (fluid falling time by seconds) of each of the sample solution and the solvent (that is, sulfuric acid) in a water tank with constant temperature of 30° C. by using a capillary viscometer called Cannon Fenske Viscometer Type 300, a relative viscosity ηrel was calculated by dividing the flow time of the sample solution by the flow time of the solvent. The calculated viscosity ηrel was divided by the concentration of the sample solution to yield the intrinsic viscosity.

Crystallinity X:

Using Rigaku X-ray Diffractometer (referred to as "XRD") 12 Kw and a computer operating system, the crystallinity X was determined by the following procedures:

(i) Sampling

Wholly aromatic polyamide filament samples having a thickness of about 1,000 to 2,000 deniers were aligned as regularly as possible, and then fixed to a sample holder with a length of 2 to 3 cm.

(ii) Measurement Order

After fixing the prepared sample on a sample attachment, β-position is set up to 0°.

XRD equipment is ready to measure the crystallinity X by gently raising electric voltage and current up to 50 kV and 180 mA, respectively, after warming-up the equipment.

Equatorial pattern capable of calculating the crystallinity is measured.

Set up are the following measurement conditions in principle:

Goniometer, continuous scan mode, scan angle range of 10 to 40°, and scan speed of 2.

Measured are 2θ positions of two peaks appearing between the range of 20 to 21° and 20 to 23° of a profile in which the scanning was carried out.

The measured profile is subject to operation of Multi-peak separation method program.

After defining Background straightly from 2θ 15 to 35° and separating two crystal peaks, the crystallinity X is determined according to the following equation:

$$X = \frac{\text{Resolved peak area} - \text{Amorphous region}}{\text{Total area of the curve}} \times 100$$

Apparent Crystal Size ACS:

Using XRD, ACS was determined by the following procedures:

(i) Sampling

Wholly aromatic polyimide filament samples having a thickness of about 1,000 to 2,000 deniers were aligned as regularly as possible, and then fixed to a sample holder with a length of 2 to 3 cm.

(ii) Measurement Order

After fixing the prepared sample on a sample attachment, β-position is set up to 0° (the sample is fixed on the sample attachment in an axial direction of the filament to set up β-position).

XRD equipment is ready to measure ACS by gently raising electric voltage and current up to 50 kV and 180 mA, respectively, after warming-up the equipment.

Equatorial pattern capable of calculating ACS is measured.

Set up are the following measurement conditions in principle:

Goniometer, continuous scan mode, scan angle range of 10 to 40°, and scan speed of 2.

Measured are 2θ positions of two peaks appearing between the range of 20 to 21° and 22 to 23° of a profile in which the scanning was carried out.

The measured profile is subject to operation of Multi-peak separation method program.

After defining Background straightly from 2θ 15 to 35° and separating two crystal peaks, ACS is calculated by means of Scherrer equation using factors [2θ position, intensity, full-width at half-maximums (FWHM)] when K of every crystal face is 1. Such ACS means average size of crystals in every face.

Paracrystalline Parameter $g_{II}$:

Using XRD and Hosemann diffraction theory based on unit-cell area, paracrystalline parameter $g_{II}$ was determined by the following procedures:

(i) Sampling

Wholly aromatic polyamide filament samples having a thickness of about 1,000 to 2,000 deniers were aligned as regularly as possible, and then fixed to a sample holder with a length of 2 to 3 cm.

(ii) Measurement Order

After fixing the prepared sample on a sample attachment, β-position is set up to 0° (the sample is fixed on the sample attachment in an axial direction of the filament to set up β-position).

XRD equipment is ready to measure the crystallinity X by gently raising electric voltage and current up to 50 kV and 180 mA, respectively, after warming-up the equipment.

Meridional pattern capable of calculating paracrystalline parameter go is measured.

Set up are the following measurement conditions in principle:

Goniometer, continuous scan mode, scan angle range of 10 to 40°, and scan speed of 0.5. [since the peak intensity is very small, given is a beam exposure time with step/scan time sufficient to increase the peak intensity up to 2,000 CPS]

Measured is 2θ position of a peak (002 plane) appearing between 10 and 15° of a profile in which the scanning was carried out.

The measured profile is applied in the following Hosemann equation to deduce the paracrystalline parameter $g_{II}$:

$$(\delta_S)_0^2 = (\delta_S)_c^2 + (\delta_S)_{II}^2 = \frac{1}{L_{wd}^2} + \frac{(\pi g_{II})^4 m^4}{d_{wd}^2}$$

wherein $\delta_s$ means dispersion degree of diffraction peak, L is crystal size, d is spacing of lattice face, and m means order of diffraction peak.

INDUSTRIAL APPLICABILITY

As described above, the present invention is effective to manufacture wholly aromatic polyamide filament with excellent strength and modulus.

What is claimed is:

1. A method of manufacturing wholly aromatic polyamide filament, comprising: dissolving wholly aromatic polyamide polymer in a concentrated sulfuric acid solvent to prepare a spinning liquid dope; spinning the liquid dope through a spinneret to give a spun material; and feeding the spun material through a non-coagulation fluid layer into a coagulant injection tank containing coagulant, characterized in that the method comprises the step of multi-stage injecting of the coagulant with sulfuric acid concentration lowered sequentially stage by stage, to the spun material fed into the injection tank, wherein an aqueous sulfuric acid solution with sulfuric acid concentration of 10 to 20% is injected at the velocity of 1 to 10 m/sec to the spun material at a first stage, followed by a second stage to inject an aqueous sulfuric acid solution with sulfuric acid concentration of 3 to 10% at the velocity of 13 to 20 m/sec and a third stage which directly follows the second stage, wherein in the third stage, water is injected at the velocity of 20 to 25 m/sec to the spun material.

2. The method according to claim 1, wherein the coagulant is any one selected from aqueous sulfuric acid solution and water.

3. The method according to claim 1, wherein the water injected to the spun material in the third stage is recovered and reused for the aqueous sulfuric acid solution injected to the spun material in the second stage.

4. The method according to claim 1, wherein the aqueous sulfuric acid solution injected to the spun material in the second stage is recovered and reused for the aqueous sulfuric acid solution injected to the spun material in the first stage.

5. The method according to claim 1, wherein a spinning and take-up velocity ranges from 1,000 to 1,500 m/min.

* * * * *